US010668678B2

(12) United States Patent
Kast et al.

(10) Patent No.: US 10,668,678 B2
(45) Date of Patent: *Jun. 2, 2020

(54) DIE TOOL, DEVICE AND METHOD FOR PRODUCING A LENS WAFER

(71) Applicant: EV Group GmbH, St. Florian am Inn (AT)

(72) Inventors: Michael Kast, Wels (AT); Markus Wimplinger, Ried im Innkreis (AT)

(73) Assignee: EV Group GmbH, St. Florian am Inn (AT)

( * ) Notice: Subject to any disclaimer, the term of this patent is extended or adjusted under 35 U.S.C. 154(b) by 258 days.

This patent is subject to a terminal disclaimer.

(21) Appl. No.: 15/649,696

(22) Filed: Jul. 14, 2017

(65) Prior Publication Data

US 2017/0305086 A1  Oct. 26, 2017

Related U.S. Application Data

(62) Division of application No. 13/818,129, filed as application No. PCT/EP2010/005374 on Sep. 2, 2010, now Pat. No. 9,738,042.

(51) Int. Cl.
*B29D 11/00* (2006.01)
*G02B 3/00* (2006.01)

(52) U.S. Cl.
CPC .... *B29D 11/00951* (2013.01); *B29D 11/0048* (2013.01); *B29D 11/00307* (2013.01); *B29D 11/00365* (2013.01); *G02B 3/0031* (2013.01)

(58) Field of Classification Search
CPC ........ B29D 11/00951; B29D 11/00307; B29D 11/00365; B29D 11/0048; G02B 3/0031
See application file for complete search history.

(56) References Cited

U.S. PATENT DOCUMENTS

| | | | |
|---|---|---|---|
| 4,076,780 A | 2/1978 | Ditto | 264/40.5 |
| 5,324,623 A | 6/1994 | Tsumori | 430/321 |
| 5,853,960 A | 12/1998 | Tran et al. | 430/321 |
| 5,871,888 A | 2/1999 | Heremans et al. | 430/321 |
| 6,187,243 B1 | 2/2001 | Miyajima | 264/272.15 |
| 6,363,603 B1 | 4/2002 | Nemoto et al. | 29/458 |
| 6,846,137 B1 | 1/2005 | Border et al. | 409/163 |
| 8,540,906 B2 | 9/2013 | Yoshida | 264/1.32 |
| 9,194,700 B2 | 11/2015 | Kast et al. | G01B 21/24 |
| 9,738,042 B2 * | 8/2017 | Kast | B29D 11/00307 |
| 9,817,216 B2 * | 11/2017 | Kast | B29D 11/00365 |
| 2004/0090571 A1 | 5/2004 | Fujita | 349/95 |

(Continued)

FOREIGN PATENT DOCUMENTS

| | | | | |
|---|---|---|---|---|
| EP | 1 201 409 A2 | 5/2002 | | B29D 11/00 |
| EP | 2 168 746 A1 | 3/2010 | | B29C 43/02 |

(Continued)

OTHER PUBLICATIONS

International Search Report from corresponding International Patent Application No. PCT/EP2010/005374 dated Jun. 6, 2011.

(Continued)

*Primary Examiner* — Mathieu D Vargot
(74) *Attorney, Agent, or Firm* — Kusner & Jaffe

(57) ABSTRACT

This invention relates to a die tool, a device and a method for producing, in particular embossing, a monolithic lens wafer that has a large number of microlenses.

17 Claims, 6 Drawing Sheets

(56) References Cited

U.S. PATENT DOCUMENTS

| | | | |
|---|---|---|---|
| 2005/0088751 A1 | 4/2005 | Shimizu et al. | 359/619 |
| 2006/0157444 A1 | 7/2006 | Nakamura et al. | 216/54 |
| 2006/0231979 A1 | 10/2006 | Santen et al. | 264/319 |
| 2007/0141191 A1 | 6/2007 | Kruijt-Stegeman et al. | 425/174.4 |
| 2007/0228610 A1 | 10/2007 | Sreenivasan et al. | 264/319 |
| 2008/0073604 A1 | 3/2008 | Suehira et al. | 250/559.3 |
| 2008/0217813 A1 | 9/2008 | Chou | 264/293 |
| 2009/0161106 A1 | 6/2009 | Shin et al. | 356/399 |
| 2009/0220629 A1 | 9/2009 | Narasimalu et al. | 425/149 |
| 2010/0025868 A1 | 2/2010 | Louh | 264/1.1 |
| 2010/0123260 A1 | 5/2010 | Duparre et al. | 264/1.38 |
| 2010/0157428 A1 | 6/2010 | Wu et al. | 359/622 |
| 2010/0208354 A1 | 8/2010 | Okazaki et al. | 359/622 |
| 2010/0270692 A1 | 10/2010 | Yu | 264/1.38 |
| 2010/0270705 A1 | 10/2010 | Okushima et al. | 264/293 |
| 2010/0289190 A1 | 11/2010 | Kawakami et al. | 264/496 |
| 2011/0278750 A1 | 11/2011 | Fujii et al. | 264/1.36 |
| 2012/0068370 A1 | 3/2012 | Saruya et al. | 264/1.36 |
| 2012/0299208 A1* | 11/2012 | Hansen | B82Y 10/00 264/40.1 |
| 2013/0147070 A1 | 6/2013 | Kast et al. | 264/1.1 |
| 2013/0193596 A1 | 8/2013 | Kast et al. | 264/1.1 |
| 2015/0290888 A1 | 10/2015 | Kast et al. | 264/1.1 |

FOREIGN PATENT DOCUMENTS

| | | | |
|---|---|---|---|
| JP | H08238636 A | 9/1996 | B29C 33/04 |
| JP | 2002-014205 A | 1/2002 | B29D 11/00 |
| JP | 2004-163695 A | 6/2004 | B29C 43/02 |
| JP | 2008-152038 A | 7/2008 | B29C 39/10 |
| JP | 2008-244441 A | 10/2008 | B29C 59/02 |
| JP | 2010-173196 A | 8/2010 | B29C 43/02 |
| WO | WO 2009/133756 A1 | 11/2009 | G02B 3/00 |
| WO | WO 2010/087077 A1 | 8/2010 | B29D 11/00 |
| WO | WO 2010/087083 A1 | 8/2010 | B29C 39/10 |
| WO | WO 2010/137368 A1 | 12/2010 | B29C 39/10 |
| WO | WO 2012/028163 A1 | 3/2012 | G02B 3/00 |
| WO | WO 2012/028166 | 3/2012 | G01B 21/24 |
| WO | WO 2012/028166 A1 | 3/2012 | G01B 21/24 |

OTHER PUBLICATIONS

International Search Report from corresponding International Patent Application No. PCT/EP2010/006518 dated Jun. 21, 2011.
Office Action issued in corresponding European Patent Application No. 10 778 855.6 dated Nov. 26, 2013.
Office Action issued in corresponding Japanese Patent Application No. 2013-526317 dated Apr. 7, 2014.
Office Action issued in corresponding Japanese Patent Application No. 2013-524355 dated Jul. 7, 2014.
Office Action issued in corresponding Chinese Patent Application No. 201080068891.4 dated Jun. 30, 2014 (with English translation).
Office Action issued in corresponding U.S. Appl. No. 13/818,129 dated Jul. 27, 2016.
Office Action issued in corresponding U.S. Appl. No. 14/748,716 dated Sep. 28, 2016.
Office Action issued in corresponding U.S. Appl. No. 13/818,129 dated Nov. 30, 2016.
Google Translate—English Language, translate.google.com, of Saito, et al., International Publication No. WO2010087077, [0057]-[0082].

* cited by examiner

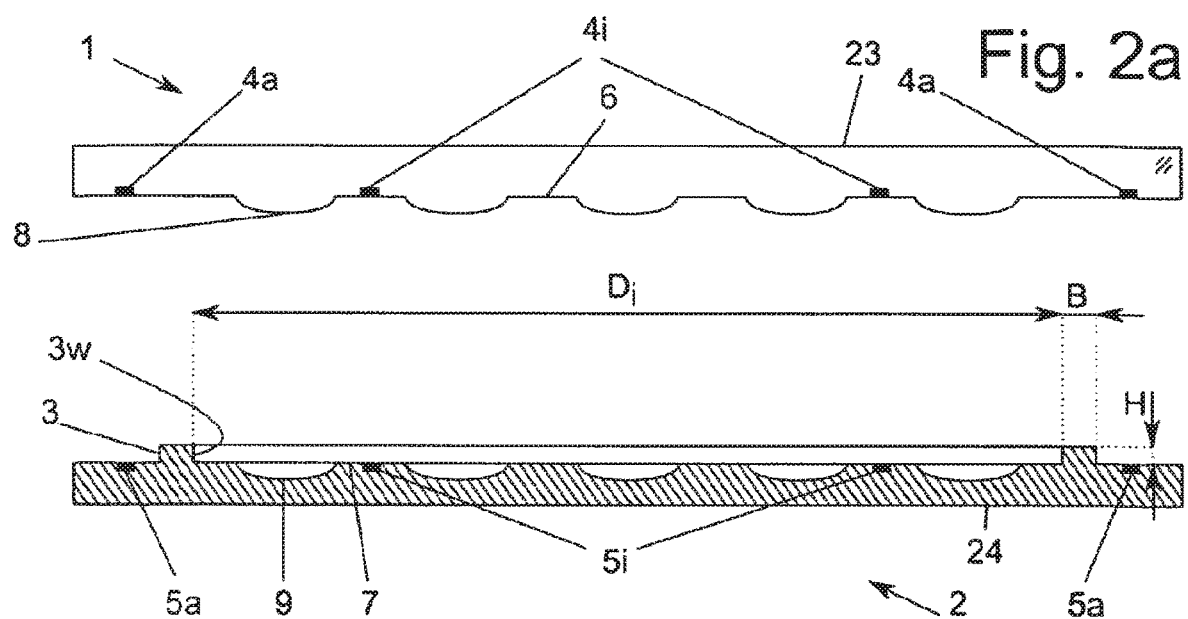
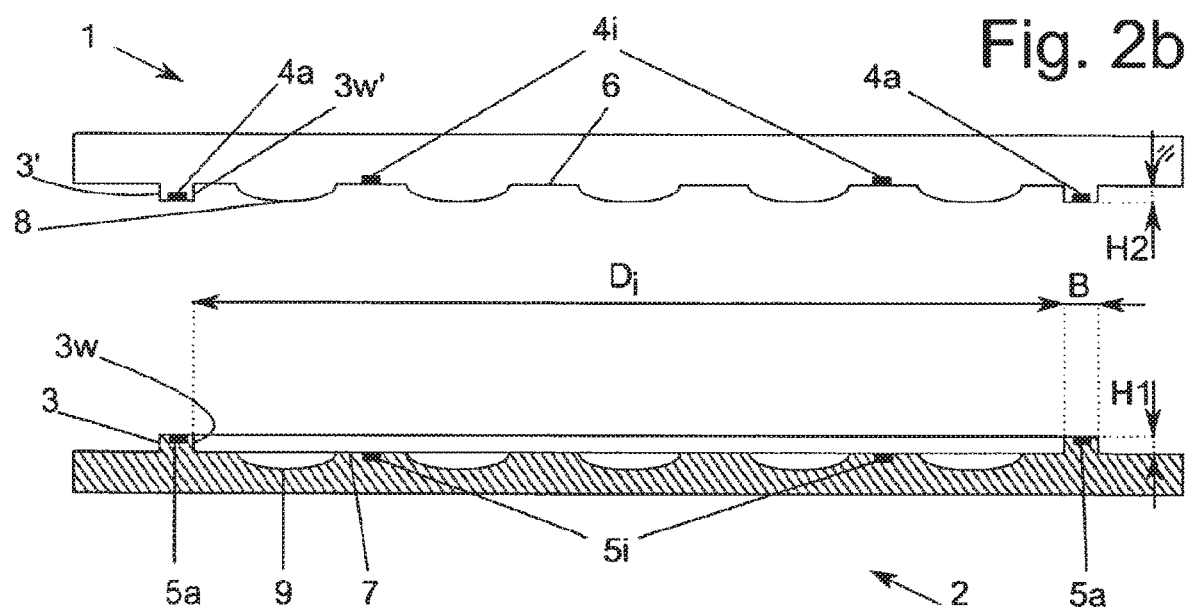
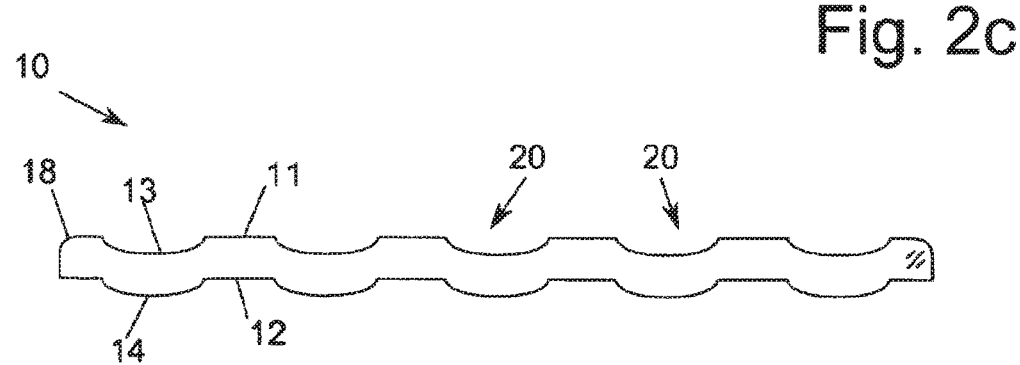

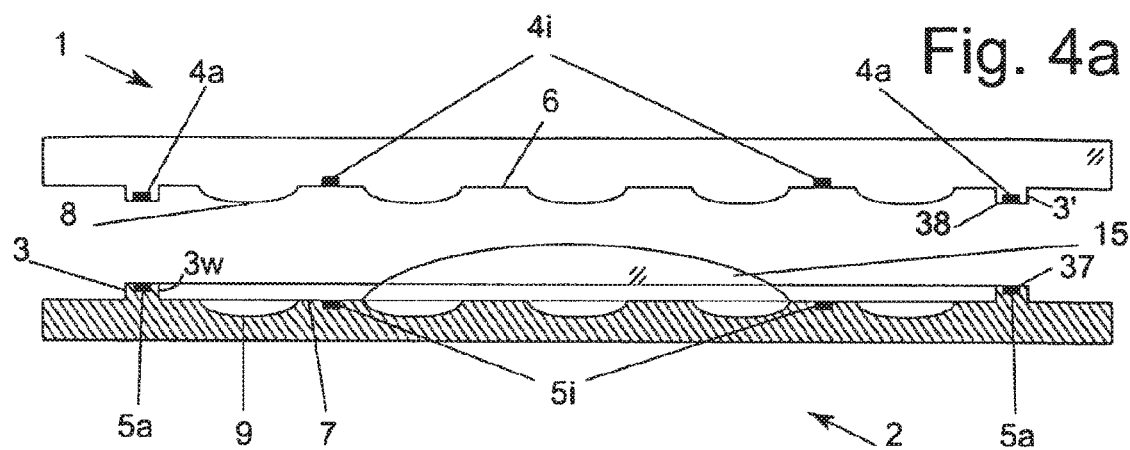
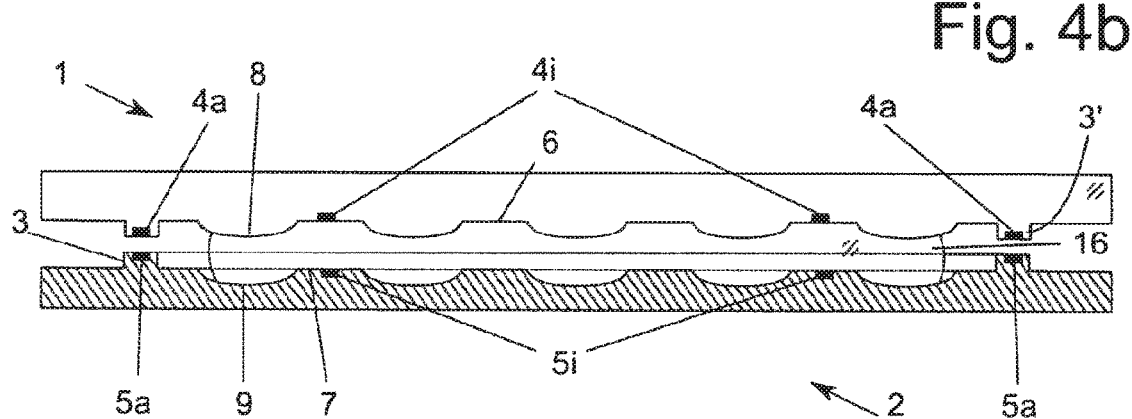
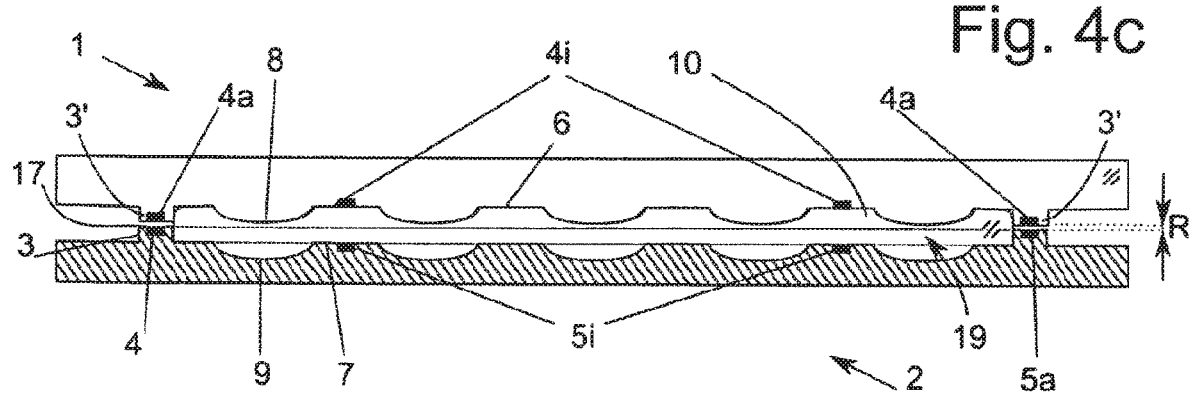

DIE TOOL, DEVICE AND METHOD FOR PRODUCING A LENS WAFER

RELATED APPLICATIONS

The present application is a division of U.S. application Ser. No. 13/818,129, filed Feb. 21, 2013, now U.S. Pat. No. 9,738,042, which is a U.S. National Stage Application of International Application No. PCT/EP2010/005374, filed Sep. 2, 2010, said patent applications hereby fully incorporated herein by reference.

FIELD OF THE INVENTION

This invention relates to a die tool, a device and a method for producing, in particular embossing, a monolithic lens wafer that has a large number of microlenses.

BACKGROUND OF THE INVENTION

Microlenses are primarily used for devices that require an optical focusing system, such as, for example, for cameras of mobile telephones. Because of the push for miniaturization, functional areas are to be smaller and smaller. The more the microlenses are to be miniaturized, the more difficult will be their optically correct production, since at the same time, there is an enormous cost pressure for the microlenses that are ideally to be produced in mass production. In the prior art, microlenses are produced on a carrier substrate by different production methods, as shown in, for example, U.S. Pat. No. 6,846,137 B1, U.S. Pat. Nos. 5,324,623, 5,853,960 and 5,871,888. It is a common aspect of all previously-mentioned methods that, based on principle, a certain thickness is necessary and the light that goes through the microlens has to pass through not only the lens but the carrier substrate. Because of the simultaneously called-for high quality and the requirements for higher resolution with simultaneously higher brilliance, which depends on, i.e., the thickness and the number of optics along the optical axis, i.e., the beam path, another optimization of the microlenses according to the prior art is desirable.

Moreover, the requirement exists for as high a light yield as possible, which is decisive in particular for microoptics systems since, in most cases, the image sensor occupies a very small surface on which light can occur.

A production method for an unsupported microlens field is disclosed in EP 2 168 746 A1.

In the production of unsupported microlens fields, the shrinkage of the lens field material is problematic during the production of the lens field, in particular during embossing and curing.

SUMMARY OF THE INVENTION

The object of this invention is to indicate a die tool or a generic device or a generic method with which, in particular in mass production, lens wafers can be produced with microlenses of high light yield as well as high brilliance and simultaneously higher production accuracy.

This object is achieved with the features of the independent claim(s). Advantageous further developments of the invention are indicated in the subclaims. All combinations that consist of at least two of the features indicated in the description, the claims and/or the figures also fall within the scope of the invention. In the case of the indicated value ranges, values as boundary values that are within the above-mentioned limits are also to be regarded as disclosed and can be claimed in any combination.

The invention is based on the idea of configuring a die tool for the production of the lens wafer in such a way that the die is designed bordering an embossing space for holding the curable fluid for the production of the lens field in such a way that during embossing or production of the lens field, a lateral peripheral edge of the lens field is automatically designed. In this way, the further processing of the lens field is clearly simplified, since already present carrier systems and handling devices can be used for this purpose. At the same time, it is made possible to produce a very homogeneous, optimally curing lens field with higher accuracy. By the configuration according to the invention, in addition it is possible to produce virtually any lens shapes with a single embossing step as a monolithic lens wafer with a large number of microlenses, in particular spherical and/or aspherical, convex and/or concave, as well as Fresnel lenses.

According to the invention, because of the configuration of the die tool, an unsupported microlens field can be produced in which microlenses have a smaller thickness than microlenses with carriers because the carrier is eliminated.

According to an advantageous embodiment of the die tool, it is provided according to the invention that the projection is designed as a particularly annular, preferably circular, bank, in particular with an inside diameter Di of 200 mm, 300 mm or 450 mm. In this respect, the handling of the lens wafer is further simplified.

In addition, it is advantageously provided that during embossing, the embossing space is partially bordered, in particular above, by the second embossing side.

According to another advantageous embodiment of the invention, it is provided that at least one of the dies, in particular the first die, is permeable to electromagnetic radiation. In this way, not only the curing by irradiation through the die can take place, but also the detection of some orientation marks for orientation and wedge error compensation in the production of the lens wafer.

The invention is further developed in that the first die has first orientation marks for orienting the first die relative to the second orientation marks of the second die. In this respect and in particular by integration of the orientation marks in the die, preferably in the projection, a high-precision orientation of the die is made possible, and because of the configuration, according to the invention, of the die tool with a projection, subsequent errors in the further processing and further handling are minimized or completely eliminated. From the edge of the lens wafer produced with the die tool according to the invention, the position of any individual microlens that is provided in the lens wafer can be determined precisely, even if shrinkage of the lens wafer material has taken place.

With this invention, orientation accuracy in the X- and Y-directions is possible with a reproducible accuracy of less than 3 µm, in particular less than 1 µm, preferably less than 0.5 µm, and still more preferably less than 0.1 µm, of deviation in orientation accuracy.

In addition to the previously described die tool, the device according to the invention has the following features:

A first holding system for, in particular statically fixed, holding of the first die on a holding side that faces away from the first embossing side. The holding system can be a chuck, which is mounted on a fixed or static frame. The fixing of the first die can be done, for example, by vacuum grooves.

A second holding system for holding the second die on its holding side that faces away from the second carrier side.

The holding system can be designed in particular also as a chuck, preferably with a fixing by vacuum grooves.

The device is designed in such a way that it can embody a controlled movement of the second die in an X-Y plane and a Z-direction that runs orthogonally thereto as well as a controlled rotation around an axis of rotation that runs parallel to the Z-direction for orienting the first die to the second die. The X-Y plane is essentially parallel to the embossing sides of the die during embossing.

In addition, the device can be controlled so that the orientation is done based on the position of the die, in particular the position of the orientation marks.

According to an advantageous embodiment of the device according to the invention, a lift drive is provided, by which the movement of the second holding system can be executed in the Z-direction. The lift drive consists in particular of three motorized spindle drives positioned parallel to one another in axial direction and independent of one another, preferably rotationally symmetrical on the periphery at an angular distance of 120 degrees. In this respect, on the one hand, the parallel movement of the second die with the holding system in the Z-direction is made possible. On the other hand, the lift drive can simultaneously cause the second drive to tip over.

If the device according to the invention comprises wedge error compensating means, with which a wedge error between the dies can be compensated for, the dies can be oriented exactly parallel to one another, by which a homogeneous lens with an optimal optical axis can be produced. This is particularly important when several lenses are later stacked.

The wedge error compensating means are advantageously provided as an orienting table or chuck, which is fixed to the lift drive.

In another embodiment of the invention, it is provided that optics, movable in particular in the Z-direction, are provided for detecting the position of each of the orientation marks in the X-, Y- and Z-directions.

The method according to the invention is characterized with the use of the previously described die tool and/or the previously described device by the following method steps:

The dies are arranged and fixed relative to the corresponding holding systems,

If necessary, an at least rough orientation (so-called pre-alignment) of the dies to one another in the X- and Y-directions as well as in the direction of rotation is carried out around the axis of rotation, in particular with an accuracy of less than 100 µm, preferably less than 50 µm, and still more preferably less than 10 µm, A wedge error compensation is done by wedge error compensating means to orient the embossing sides in parallel, in particular with an accuracy of less than 5 µm, preferably less than 3 µm, and still more preferably less than 1 µm, Then, the application of a curable fluid, in particular a polymer, is carried out in fluid form on one of the flat embossing sides, in particular the second embossing side, which preferably is arranged below and—because of the projection—forms an embossing space, whose bottom forms the second embossing side, Embossing the lens wafer by shaping and subsequent curing of the curable fluid, whereby shaping is done by moving the dies onto one another.

According to an advantageous embodiment of the method, it is provided that the embossing is done without contact between the dies. In this way, an open ring gap is formed on the side edge of the embossing space, where said ring gap is designed allowing a lateral exit of the curable fluid when shaping or embossing the lens wafer.

If the embossing is done based on force and/or position in the Z-direction, a precise definition and homogenous production of the lens wafer is possible with a reproducible accuracy of less than 10 µm, in particular less than 5 µm, preferably less than 3 µm, and still more preferably less than 1 µm, of deviation in orientation accuracy.

The first and second dies are configured as lens dies with the negatives that form the microlenses, i.e., concave/convex embossing structures, whereby spherical/aspherical and/or Fresnel lenses are also conceivable. At a diameter of a lens die of approximately 200 mm, for example, approximately 2,000 microlenses can be embossed in one embossing step.

The curable fluid can be formed, according to the invention, from a UV-settable or thermosettable material, whereby the lens material according to the invention is at least predominantly—preferably completely—solvent-free and is suitable for complete cross-linking.

Because of the monolithic production of the lens wafer according to the invention, the latter has a homogeneously thermal expansion coefficient, so that any microlens produced from the lens wafer is self-similar under varying temperature conditions and almost does not change its optical properties.

Other advantages, features and details of the invention will emerge from the subsequent description of preferred embodiments and based on the drawings.

BRIEF DESCRIPTION OF THE DRAWINGS

FIG. 2a shows a diagrammatic, cut side view of a die tool according to the invention for the production of a lens wafer that has a large number of microlenses in a first embodiment, FIG. 2b shows a diagrammatic, cut side view of the die tool according to the invention in a second embodiment, FIG. 2c shows a diagrammatic, cut side view of the lens wafer that is produced with a die tool according to FIG. 2a or FIG. 2b or a device according to FIG. 1, FIGS. 3a to 3c show a diagrammatic representation of the course of the process of the embossing of a lens wafer with the die tool according to FIG. 2a, FIGS. 4a to 4c show a diagrammatic representation of the course of the process of the embossing of a lens wafer with the die tool according to FIG. 2b, FIGS. 5a to 5c show a diagrammatic, cut side view of the die tool according to the invention in a third embodiment and the corresponding course of the process of embossing of the lens wafer.

DETAILED DESCRIPTION OF THE INVENTION

In the figures, advantages and features of the invention are characterized with these identifying reference numbers in each case according to the embodiments of the invention, whereby components or features with the functions that are the same or that act the same are characterized with identical reference numbers.

Figure 1:
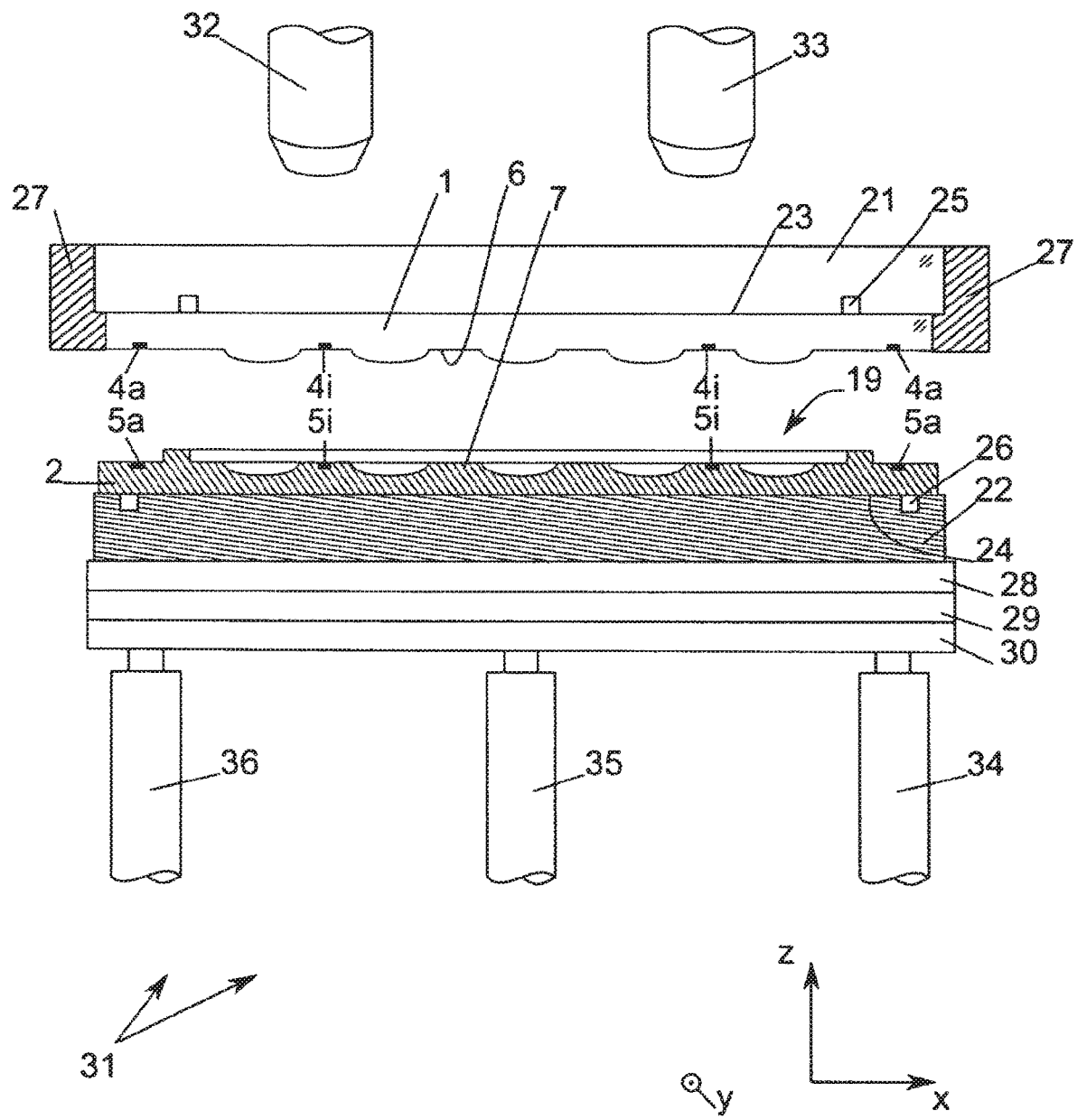
FIG. 1 shows a diagrammatic, cut side view of a device according to the invention for the production of a lens wafer that has a large number of microlenses.

In FIG. 1, a system that consists of a device according to the invention with a die tool according to the invention is shown. The die tool consists of a first die 1 and a second die 2, and the die tool is shown in detail in a first and second embodiment according to FIGS. 2a and 2b and further described below. In FIG. 1, the die tool is used in the device according to the embodiment shown in FIG. 2a.

The first die 1 is fixed on its first holding side 23, in particular horizontally, by at least one vacuum strip 25 on a first holding system 21. The first holding system 21 is fixed rigidly and as vibration-free as possible by a particularly annular, preferably circular, holding device 27, in particular to a massive frame that is not shown in the figures.

The first holding system 21 is designed as a chuck that is at least partially permeable, in particular for electromagnetic radiation. The electromagnetic radiation is in particular visible or UV light. The first die 1 is also permeable to electromagnetic radiation, in particular visible light.

The first die 1 has in particular embedded first orientation marks 4a, 4i, in particular on its first embossing side 6 opposite to the first holding side 23. The position of the first orientation marks 4a, 4i in a horizontal X-direction in FIG. 1 and in a Y-direction that is orthogonal to the X-direction as well as in a Z-direction that runs perpendicular thereto can be detected by—in particular—an optical detector system that consists here of microscopes 32, 33.

The detector system, in particular the microscopes 32, 33, can be moved in the X-, Y- and/or Z-directions and in each case can be fixed to be able to detect the positions of the orientation marks 4a, 4i. The detector system operates in such a way that it sends out electromagnetic radiation in the direction of the orientation marks 4a, 4i and thus detects the position of the orientation marks 4a, 4i. The detector system is arranged on the side of the first holding system 21 that faces away from the first holding side 23, i.e., above the first die 1 and the first holding system 21, and it is mounted on the frame.

A second holding system 22 is arranged below the first holding system 21 and the first die 1 and can be oriented relative to the first holding system in the X-, Y- and/or Z-directions. In addition, the second holding system 22 can be rotated by a rotational system 28 around an axis of rotation that runs in the Z-direction. The movement in the X-direction is embodied by an X drive 29, which is controlled by a control system, not shown. The movement in the Y-direction is embodied by a Y drive 30 that also is controlled by the control system and that is arranged adjacent to the X drive 29. Moreover, the control system controls the rotational system 28 and the method of the detector system or the individual microscopes 32, 33.

The movement of the second holding system 22 in the Z-direction is carried out by a lift drive 31, in particular consisting of actors 34, 35, 36. The actors 34, 35, 36 are oriented to act in particular in the Z-direction. As actors 34, 35, 36, for example, spindles are suitable. The actors 34, 35, 36 can be controlled in each case individually by the control system. The actors 34, 35, 36 are arranged distributed preferably on a side periphery below the X drive 29, the Y drive 30 or the rotational system 28, so that the components arranged on the lift drive 31 rest securely on the lift drive, and a precisely controllable movement of the second holding system 22, in particular a wedge error compensation, can be carried out by the in- and out-movement of the actors 34, 35, 36 that can be controlled independently of one another.

The second die 2 can be held in the second holding system 22 on a second holding side 24 that is opposite to the first holding side 23. The fixing is done by at least one vacuum strip 26, which preferably is arranged on the side periphery of the second die 2.

The second die 2 has in particular a second orientation mark 5a, 5i, in particular embedded, on its second embossing side 7 that faces away to the first holding side 23. The positions of the second orientation marks 5a, 5i can be detected by the detector system arranged above the first holding system 21, so that a precise control of the movement of the first die 1 relative to the second die 2 is made possible by the detection of the positions of the corresponding orientation marks 4a, 4i, 5a, 5i that are arranged opposite in each case.

The first embossing side 6 can thus be arranged and oriented parallel and opposite to the second embossing side 7, namely during the entire embossing process.

The first embossing side 6 has first embossing structures 8, and the second embossing side 7 has second embossing structures 9. The embossing structures 8, 9 correspond to the negative of a top side 11 and a bottom side 12 of a lens wafer 10 produced with the die tool or the device according to the invention; each corresponding opposite individual structure of the first and second embossing structures 8, 9 thus corresponds to the negative of a first optically active surface 13 and a second optically active surface 14 of the corresponding microlens 20. The microlenses 20 can be separated after the production of the lens wafer 10, for example by cutting.

Outside of the surface formed by the embossing structures 8, 9, a particularly annular, preferably circular, projection is provided according to the invention at least on one of the two dies 1, 2, in particular at least on the second die 2. The projection is designed in particular as a bank 3, 3'.

In the embodiment of the invention shown in FIG. 2a, only the second die 2 has a bank 3 that projects from the second embossing side 7 and rises above the second embossing structures 9. With its wall 3w pointing in the direction of the second embossing structures 9, the projection together with the second embossing side 7 forms a tublike space that is part of an embossing space 19.

Figure 3A:
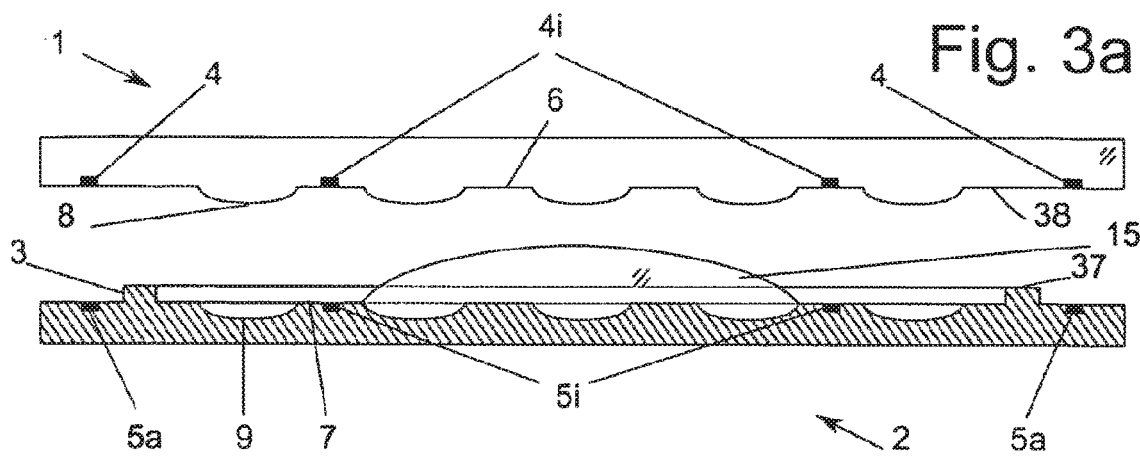
Figure 3B:
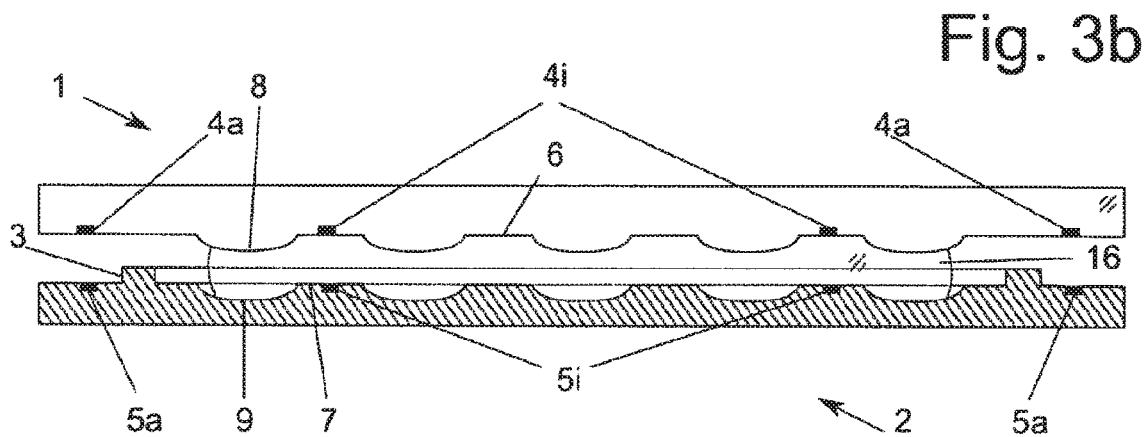
Figure 3C:
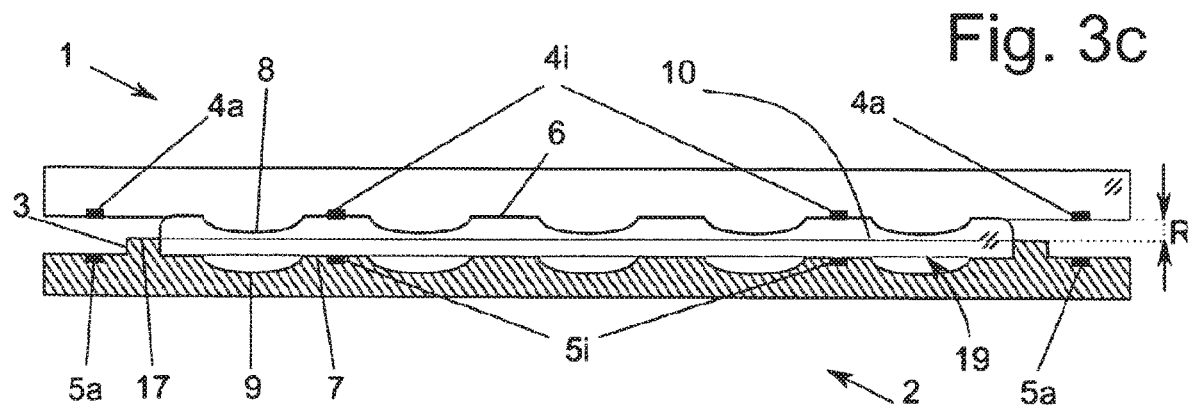

In addition, the embossing space 19 is formed in the embossing position according to FIGS. 3c and 4c of the first embossing side 6.

On its particularly circular wall 3w, the embossing space 19 has an inside diameter Di that essentially corresponds to the diameter of the lens wafer 10 to be produced according to FIG. 2b. In this case, this essentially means that a possible shrinkage of the lens wafer 10 is to be taken into consideration during embossing or curing.

In the embodiment shown in FIG. 2b, the first die 1 also has a projection that is designed as a bank 3', which borders the embossing space 19 with a wall 3w' corresponding to the wall 3w.

In the embodiment of the invention shown in FIG. 2a, at least two inside orientation marks 4i arranged in the area of the first embossing structures 8 are provided as first orientation marks 4a, 4i. In addition, at least two outside orientation marks 4a are provided outside of the first embossing structures 8, in particular outside of the projection.

In the embodiment of the invention shown in FIG. 2b, the outside orientation marks 4a are provided in the projection, in particular in the bank 3. The bank 3 is arranged opposite the bank 3' and is designed corresponding to the latter.

The bank 3, 3' has an annular width B and a height H, whereby the height H or—in the embodiment according to FIG. 2b—the heights H1, H2 of the banks 3, 3' correspond approximately to the heights of the first and second embossing structures 8, 9.

By the integration of the outside orientation marks 4a, 5a in the bank 3, 3', not only the position of the orientation marks 4a, 5a, but at the same time also the position of the banks 3, 3' can be detected in the Z-direction, whereas the height H is stored in the embodiment according to FIG. 2a.

By the device according to the invention, the dies 1, 2 can be controlled so that in the embossing position, at least between a face 37 of the bank 3 and a face 38 of the first embossing side 6 that can be arranged opposite or the bank 3', a distance R is provided, which is less than or equal to the height H, H1 or H2 of the bank 3 or the banks 3, 3'.

In FIGS. 3a and 4a, the dies 1, 2 are separated so far that a curable fluid 15 is applied, in particular as a wet spot, to the second embossing side 7. The wet spot is produced because of the surface tension of the curable fluid 15. The curable fluid 15 is preferably applied centered, thus almost equidistant or concentrically to the wall 3w.

According to FIGS. 3b and 4b, the second die 2 is moved to the first die 1 by the lift drive 31 in the Z-direction so that the curable fluid 15 that is still present in fluid form gradually penetrates in the direction of the wall 3w until the embossing position shown in FIGS. 3c and 4c is reached.

The amount of curable fluid 15 is metered exactly so that the embossing space 19 in the embossing position is almost completely filled by the curable fluid 15. The amount is advantageously measured so that a round peripheral edge is produced on the lateral upper peripheral edge 18 of the lens wafer 10, so that the orientation of the lens wafer 10 can be easily determined. The lens wafer 10, conditioned by production, has a square edge on the opposite lateral peripheral edge.

During the movement of the dies 1, 2 toward one another, controlled by the control system, the positions of the orientation marks 4a, 4i, 5a, 5i are continuously detected by the detector system and forwarded to the control system, which forwards the necessary control commands for the rotational system 28 to the X drive 29, the Y drive 30, and the lift drive 31, or the individual actors 34, 35 and 36 from the relative positions of the corresponding orientation marks 4a, 4i, 5a, 5i. A wedge error compensation can simultaneously be carried out by the actors 34, 35 and 36.

Since a minimum distance R between the first die 1 and the second die 2 is provided in the embossing position, a homogeneous and perfect shape of the lens wafer 10 can be ensured, whereby also a shrinkage of the curable fluid during embossing or curing to form the finished lens wafer can be taken into consideration.

The lens wafer 10 that is produced by the device according to the invention or the method according to the invention or the die tool according to the invention can be handled directly and without further processing steps after the embossing because of its specified outside contour by standardized wafer processing tools.

A further special advantage of the invention consists in that a monolithic lens wafer 10 can be produced according to the invention, in which a carrier substrate can be eliminated so that the shape factor of wafer level cameras produced from such lens wafers 10 or the microlenses 20 obtained therefrom can be reduced, and simultaneously decreases the production costs, since mass production is easily possible.

The use of a polymer as a curable fluid has a further positive effect on the costs of the microlenses 20.

The shrinkage of the curable fluid during embossing or curing can thus be optimized so that the lift drive 31 is based on force.

For the further processing of the monolithic lens wafer, the following properties of the lens wafer can be taken into consideration simultaneously by the die tool and the device according to the invention, namely the outside diameter, the thickness and the automatic embossing of the alignment passmarks in the lens wafer 10 for later machining processes, for example the cutting of the lens wafer 10 to separate the individual microlenses 20.

The actors 34, 35, 36 are designed in particular as three motorized spindles that are positioned parallel to one another and are operated independently of one another, in particular by rotational symmetry at an interval of 120°. In this respect, the parallel movement of the orienting table that consists of the X drive 29 and the Y drive 30 and the rotational system 28 is made possible together with the tool holding device, i.e., the second holding system 22 in the Z-direction as well as simultaneously the tilting in any direction, which is necessary for the wedge error compensation. The wedge error compensating means according to the invention can be seen herein.

During the embossing process, the embossing force can be continuously measured and simultaneously adjusted by pressure-measuring cells integrated into the lift drive 31, in particular into each actor 34, 35, 36. The pressure-measuring cells can be implemented, for example, between the spindles and the point of support on the bottom of the orienting table. According to an alternative embodiment of the invention, the first holding system 21 is not static, but can be driven in at least one prescribed direction, i.e., the X-, Y- and/or Z-directions and/or in the direction of rotation.

The orientation of the dies 1, 2 can also be carried out before the curable fluid 15 is applied to the second die 2.

The curing of the curable fluid 15 is done in particular by UV radiation and/or thermal curing.

Relative to the orientation of the dies 1, 2 (alignment), the method of the microlens embossing according to the invention is assigned to the thick layer processes. Because of the thickness of the monolithic lens wafer 10 of between 0.2 mm and 2 mm and the limited depth of focus range of the optical detector system, the detector system is positioned in the Z-direction so that the orientation marks 4a, 4i, 5a, 5i of the dies 1, 2 can be imaged exactly during the orienting process within the depth of focus of the detector system. As an alternative to this, it is conceivable according to the invention that the detector system is statically fixed in the Z-direction, and a synchronous method of the die in the Z-direction is carried out.

In this respect, the embodiment according to FIG. 2b is especially advantageous, since the orientation marks 4a and 5a are at the smallest possible distance from one another.

According to a preferred embodiment of the invention, the exact orientation of the die is carried out in the X- and Y-directions as well as in the direction of rotation with a reproducible accuracy of less than 3 µm, in particular less than 1 µm, preferably less than 0.5 µm, and more preferably less than 0.1 µm, of deviation only during the continuous embossing process, in particular against the end of the embossing process, preferably when the final distance R of the embossing position is essentially reached or when the lens wafer 10 is shaped, but still not cured.

In another embodiment of the invention, the control of the movement of the dies toward one another is taken away, i.e., in particular via measuring devices for detecting the distance R, which is measured continuously at least at one position on the periphery of the die tool.

To achieve a homogeneous surface of the lens wafer 10, at least the moving-onto-one another up to the embossing position in a vacuum is carried out according to a preferred embodiment, so that the forming of gas bubbles or hollow spaces is avoided when filling the embossing space 19 by the curable fluid 15.

According to an advantageous embodiment of the invention, it is provided that a gas-transparent polymer is used as a curable fluid 15.

According to another advantageous embodiment of the invention, it is provided that at least one of the dies 1, 2 is made from a material with open porosity, whereby the porosity is measured in such a way that the curable fluid 15 cannot penetrate into the pores, but gas molecules can escape unimpeded through the porous die.

The ejection process subsequent to the embossing process and curing process and in which the lens wafer 10 is ejected is carried out by applying an overpressure to the side of the porous die opposite to the lens wafer 10.

Figure 5A:
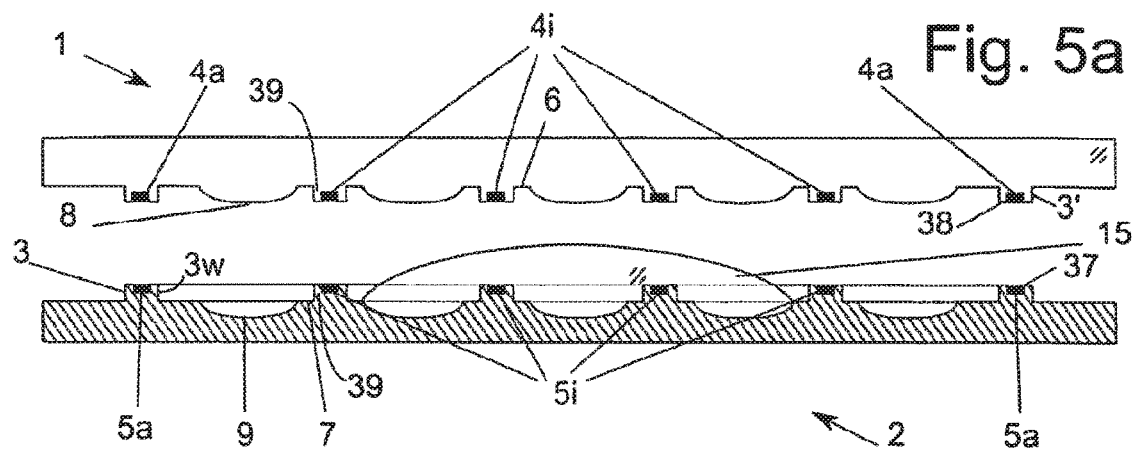
Figure 5B:
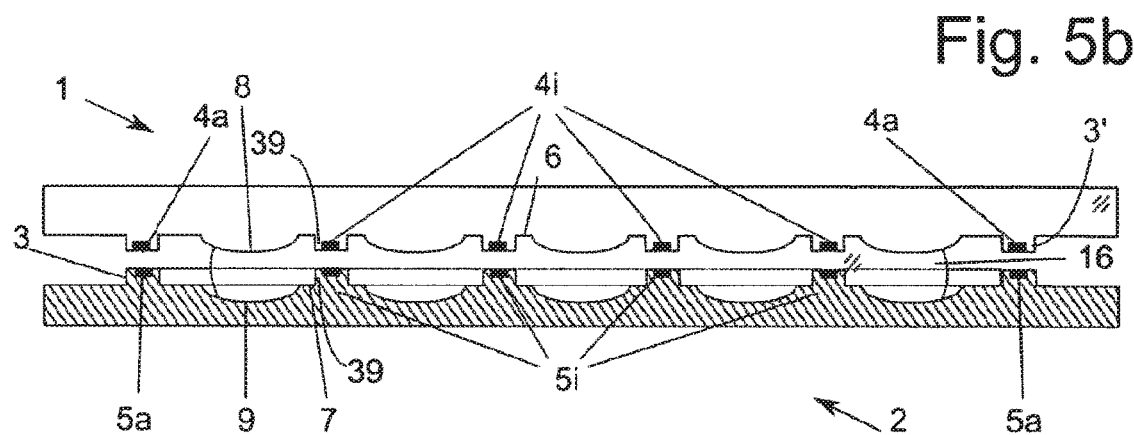
Figure 5C:
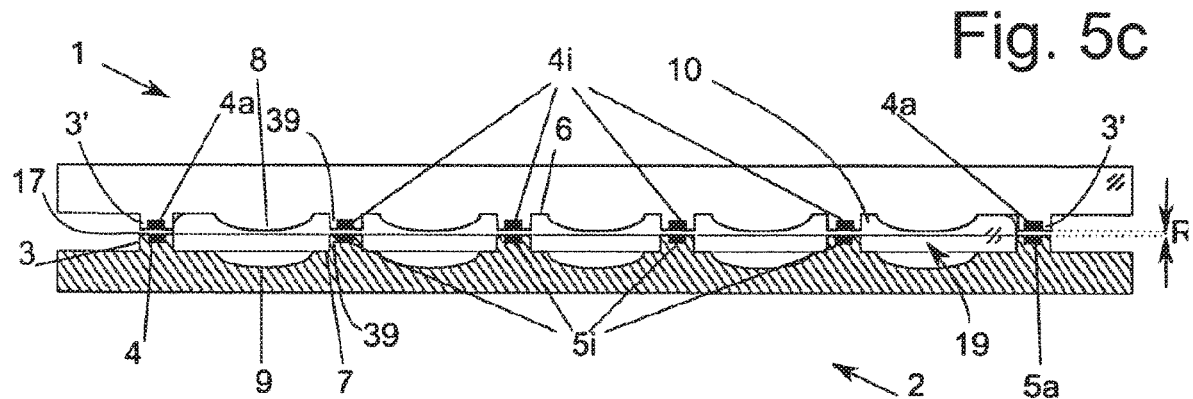

In the embodiment shown in FIGS. 5a to 5c, in addition to the embodiment shown in FIG. 2b, at least one projection that is designed as a platform 39—in the embodiment shown here, a large number of platforms 39—is provided. The height of the platform 39 is at least half as high, in particular at least ¾, and at most equally as high as the height H, H1 or H2 of the bank 3. The width of the bank 39 is at least half as wide, in particular at least ¾, and at most equally as wide as the width B of the bank 3.

Figure 6:
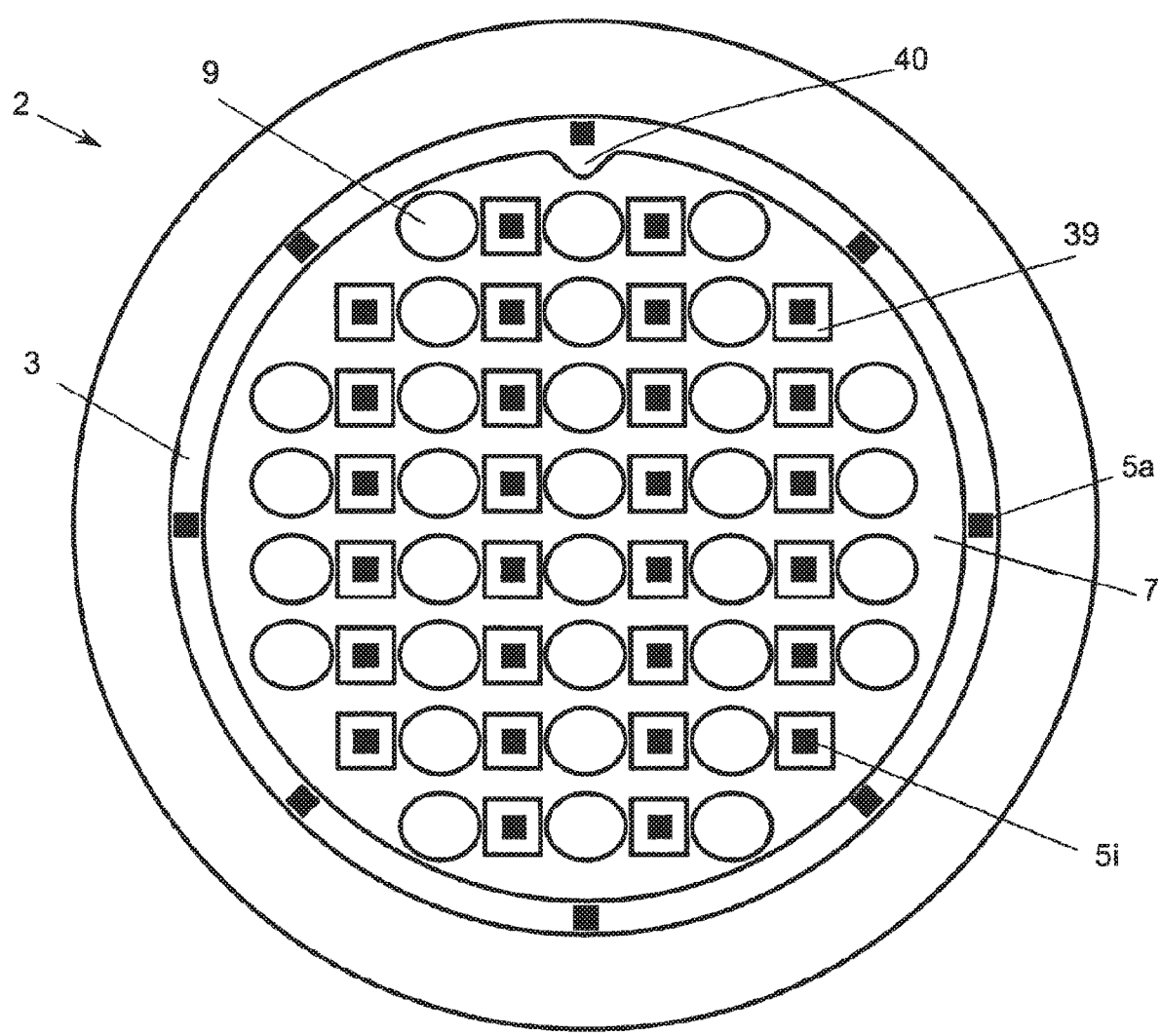
FIG. 6 shows a diagrammatic top view of a second die of the die tool according to FIG. 5.

The platforms 39 are always equidistant in each case to two adjacent second embossing structures 9 of the second die 2 (see FIG. 6).

The platforms 39 are preferably monolithic with the second die 2.

The platforms 39 can project, tapering in particular conically, from the embossing side of the second die 2.

It is especially advantageous to embed the inside orientation marks 5i in the platform 39, in particular on its side that faces away from the second holding system 22. In this way, the distance between the corresponding orientation marks 4i is minimized, so that a more precise detection is made possible by the detector system and all the more precise orientation of the dies 1, 2.

The platforms 39 are conceivable in the two embodiments according to FIGS. 2a and 2b.

In addition, it is provided in one embodiment according to the invention that the bank 3 and/or the bank 3' is/are designed in an elastically deformable manner in such a way that during embossing by contact of the faces 37 and 38, a sealing of the embossing space 19 is carried out.

The first die 1 could be made of, for example, glass, while the second die 2 is made of polymer, whereby the polymer of the bank 3 and/or the bank 3' can consist of softer polymer than the polymer of the second die 2.

In FIG. 6, a top view of the second die 2 is shown, and there a second projection 40 that points from the bank 3 and/or bank 3' inward in the direction of the embossing space 19 is provided, which is responsible for the design of a recess on the lens wafer 10. This recess preferably corresponds to a recess (notch) that is known in the case of wafers. As a result, the further handling of the lens wafer 10 is clearly simplified.

To the extent that the orientation marks 4a, 5a are designed integrated in the bank 3 and/or 3', the banks 3, 3' perform not only the function of the bordering of the embossing space 19, but also provide an improved orientation accuracy since the orientation marks are bunched up closer together and can be detected more exactly in the detector system.

This also applies for the orientation marks 4i, 5i, if the latter are designed integrated in the platforms 39.

REFERENCE SYMBOL LIST

1 First die
2 Second die
3, 3' Bank
3w, 3w' Wall
4a, 4i First orientation marks
5a, 5i Second orientation marks
6 First embossing side
7 Second embossing side
8 First embossing structures
9 Second embossing structures
10 Lens wafer
11 Top
12 Bottom
13 First optically active surface
14 Second optically active surface
15 Curable fluid
18 Edge
19 Embossing space
20 Microlens
21 First holding system
22 Second holding system
23 First holding side
24 Second holding side
25 Vacuum strip
26 Vacuum strip
27 Holding device
28 Rotational system
29 X Drive
30 Y Drive
31 Lift drive
32 Microscope
33 Microscope
34 Actor
35 Actor
36 Actor
37 Face
38 Face
39 Platform
40 Projection
Di Inside diameter
H, H1, H2 Height
B Annular width
R Distance Having described the invention, the following is claimed:

1. A device for the production of a substrate having a plurality of microlenses, the device comprising:
   a die tool, comprising:
      a first die with a first embossing structure having a first embossing side; and
      a second die with a second embossing structure having a second embossing side;
   a first holding system configured to hold the first die rigidly fixed to a first holding side that faces away from the first embossing side;
   a second holding system configured to hold the second die on a second holding side that faces away from the second embossing side; and
   a control system configured to provide a controlled movement of the second die in an X-Y plane and a Z-direction that runs orthogonally thereto and a controlled rotation around an axis of rotation that runs parallel to the Z-direction for orienting the first die to the second die, the control system being further configured to control orientation of the first and second dies based on a position of the first and second dies.

2. The device according to claim 1, wherein the first die has first orientation marks embedded in the first embossing side,
wherein the second die has second orientation marks embedded in the second embossing side, and
wherein the first orientation marks are configured to orient the first die opposite the second orientation marks of the second die.

3. The device according to claim 2, wherein at least two inside orientation marks arranged in an area of the first embossing structure are provided as the first orientation marks, and
wherein at least two outside orientation marks are provided outside of the first embossing structure and outside of a projection on at least one of the first and second dies.

4. The device according to claim 1, further comprising a lift drive configured to move the second holding system in the Z-direction.

5. The device according to claim 1, further comprising wedge error compensator configured to compensate a wedge error between the first and second dies.

6. The device according to claim 2, further comprising optics configured to detect a position of the orientation marks in the X-, Y- and Z-directions, the optics being movable in the Z-direction.

7. The device according to claim 1, wherein at least one of the first embossing side and the second embossing side has a projection that at least partially borders an embossing space circumferentially.

8. The device according to claim 1, wherein at least one of the first and second dies is permeable to electromagnetic radiation.

9. The device according to claim 1, wherein the first die is made of glass and the second die is made of polymer.

10. The device according to claim 9, wherein a polymer of a projection on the first die has a softness that is greater than a softness of a polymer of the second die.

11. A device for the production of a monolithic lens wafer that has a large number of microlenses, said device comprising:
a die tool, comprising:
a first die with a first embossing structure having a first embossing side; and
a second die with a second embossing structure having a second embossing side;
a wedge error compensator configured to compensate for a wedge error between the first and second dies to achieve parallel orientation of the first and second embossing sides;
a first holding system for holding the first die on its first holding side that faces away from the first embossing side;
a second holding system for holding the second die on its second holding side that faces away from the second embossing side; and
a control system for providing a controlled movement of the second die in an X-Y plane and a Z-direction that runs orthogonally thereto and a controlled rotation around an axis of rotation that runs parallel to the Z-direction for orienting the first die to the second die,
wherein the orientation of the first and second dies is controlled based on a position of the first and second dies without contact between the first and second dies during embossing,
wherein at least one of the first and second dies on its respective embossing side has a projection that at least partially borders an embossing space circumferentially, and
wherein the first and second dies are oppositely arranged and fixed to the respective first and second holding systems.

12. The device according to claim 11, wherein at least one of said first and second dies has an annular projection having an inside diameter Di of 200 mm, 300 mm or 450 mm.

13. The device according to claim 11, wherein, during embossing, an embossing space is partially bordered by the second embossing side.

14. The device according to claim 11, wherein at least one of the first and second dies is permeable to electromagnetic radiation.

15. The device according to claim 11, wherein the first die has first orientation marks and the second die has second orientation marks, and
wherein the first and second orientation marks are for orienting the first die relative to the second die.

16. The device according to claim 11, further comprising a lift drive for moving the second holding system in the Z-direction.

17. The device according to claim 11, further comprising optics movable in the Z-direction for detecting a position of respective first and second orientation marks of said first and second dies in the X-, Y- and Z-directions.

* * * * *